(12) United States Patent
Lee (10) Patent No.: US 10,867,513 B2
(45) Date of Patent: Dec. 15, 2020

(54) VEHICULAR SYSTEM FOR OUTPUTTING WARNING AND METHOD OF CONTROLLING THE SAME

(71) Applicants: Hyundai Motor Company, Seoul (KR); Kia Motors Corporation, Seoul (KR)

(72) Inventor: Sang Min Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/708,688

(22) Filed: Dec. 10, 2019

(65) Prior Publication Data

US 2020/0193820 A1   Jun. 18, 2020

(30) Foreign Application Priority Data

Dec. 13, 2018  (KR) .................. 10-2018-0161214

(51) Int. Cl.
G08G 1/09    (2006.01)
G08G 1/0968  (2006.01)
B60Q 9/00    (2006.01)

(52) U.S. Cl.
CPC ............. *G08G 1/0968* (2013.01); *B60Q 9/00* (2013.01)

(58) Field of Classification Search
None
See application file for complete search history.

(56) References Cited

U.S. PATENT DOCUMENTS

| | | | |
|---|---|---|---|
| 8,248,223 B2* | 8/2012 | Periwal ................... | B60Q 9/00 180/170 |
| 8,576,055 B2 | 11/2013 | Hara et al. | |
| 2003/0181822 A1 | 9/2003 | Victor | |
| 2010/0207787 A1* | 8/2010 | Catten ............. | G08G 1/096716 340/905 |
| 2013/0135472 A1* | 5/2013 | Wu ....................... | G07C 5/0866 348/148 |
| 2015/0183410 A1* | 7/2015 | Ko ...................... | B60T 8/17558 701/96 |
| 2016/0046297 A1 | 2/2016 | Kawakami et al. | |
| 2016/0152233 A1 | 6/2016 | Fung et al. | |

(Continued)

FOREIGN PATENT DOCUMENTS

| | | |
|---|---|---|
| JP | 2003231449 A | 8/2003 |
| JP | 2006215728 A | 8/2006 |
| JP | 2014106926 A | 6/2014 |

*Primary Examiner* — Brent Swarthout
(74) *Attorney, Agent, or Firm* — Slater Matsil, LLP (57) ABSTRACT

A method can be used for outputting a warning of a vehicle. The method includes making a request for a route to a telematics center, receiving route information, a reference point, and point-deduction standard information from the telematics center in response to the request, setting the received reference point and deducting a point corresponding to the point-deduction standard information from the reference point whenever a point-deduction behavior is detected, and issuing the warning when a current point is equal to or less than a preset reference point. The reference point and the point-deduction standard information are determined in consideration of each of a time period of the request and at least one road included in the route information.

17 Claims, 6 Drawing Sheets

(56) References Cited

U.S. PATENT DOCUMENTS

2016/0207455 A1* 7/2016 Kim .................. B60W 40/08
2016/0334227 A1* 11/2016 Davidson ............... G06Q 10/04
2019/0135176 A1* 5/2019 Miki .................. B60K 28/02

* cited by examiner

FIG. 6

VEHICULAR SYSTEM FOR OUTPUTTING WARNING AND METHOD OF CONTROLLING THE SAME

CROSS-REFERENCE TO RELATED APPLICATIONS

This application claims priority to Korean Patent Application No. 10-2018-0161214, filed on Dec. 13, 2018, which application is hereby incorporated herein by reference.

TECHNICAL FIELD

Embodiments relate to a vehicular system for outputting a warning and a method of controlling the same.

BACKGROUND

In accordance with recent trends, vehicles have come to have installed therein a greater variety of electronic devices including devices for providing services in consideration of the safety of a driver have been increasingly installed in vehicles.

For example, some vehicles output warning through a steering wheel, a seat, a sound, or the like in the case of lane departure of a driver and prevent lane departure through active steering control.

However, the aforementioned function corresponds to a separate lane departure event only, and there is a problem in that it is not possible to fundamentally overcome the situation in which a driver has difficulty driving a vehicle normally.

SUMMARY

Embodiments relate to a vehicular system for outputting a warning and a method of controlling the same for variably setting a warning output reference based on a route when a driver alert is output.

Accordingly, embodiments of the present invention are directed to a vehicular system for outputting a warning and a method of controlling the same that substantially obviates one or more problems due to limitations and disadvantages of the related art.

An embodiment of the present invention provides a vehicular system for outputting an alert when an abnormal driving situation is detected and a method of controlling the same.

In a particular embodiment, the present invention provides a vehicular system for considering the surrounding conditions, such as a route and a time period, in order to determine whether to output an alert, and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

As an example, a method of outputting a warning of a vehicle includes making a request for a route to a telematics center, receiving route information, a reference point, and point-deduction standard information from the telematics center in response to the request, setting the received reference point and deducting a point corresponding to the point-deduction standard information from the reference point whenever a point-deduction behavior is detected, and when a current point is equal to or less than a preset reference point, issuing the warning, wherein the reference point and the point-deduction standard information are determined in consideration of each of a time period of the request and at least one road included in the route information.

In another aspect of the present invention, a method of controlling a telematics center includes receiving a request for a route from a vehicle, generating route information in response to the request, determining a reference point and point-deduction standard information corresponding to each of at least one road included in the route information, and transmitting the determined route information, the reference point, and the point-deduction standard information to the vehicle, wherein the determining is performed in consideration of a time at which the request for the route is received.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Exemplary embodiments of the present invention are described in detail so as for those of ordinary skill in the art to easily implement with reference to the accompanying drawings. However, the present invention may be implemented in various different forms and is not limited to these embodiments. To clearly describe the present invention, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Prior to a description of embodiments of the present invention, the configuration of a vehicular system for outputting a warning applicable to embodiments of the present invention will be described with reference to FIG. 1.

Figure 1:
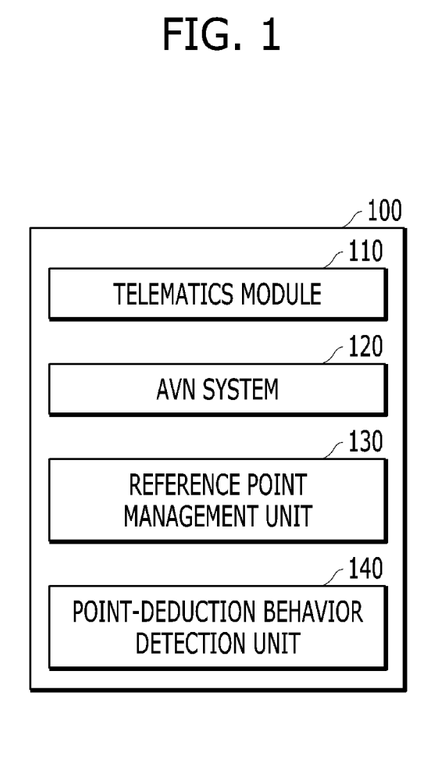
FIG. 1 is a block diagram showing an example of the configuration of a vehicular system for outputting a warning according to an embodiment of the present invention.

FIG. 1 is a block diagram showing an example of the configuration of a vehicular system for outputting a warning according to an embodiment of the present invention.

Referring to FIG. 1, a vehicular system for outputting a warning 100 according to an embodiment may include a telematics module no configured to exchange data with a telematics center and to connect an attendant call, an audio/video/navigation (AVN) system 120 configured to provide at least a navigation function, a reference point management unit 130 configured to manage a reference point as a reference for determining whether to output a warning to a driver, and a point-deduction behavior detection unit 140 configured to detect an abnormal driving behavior, which is the reason for deducting points from the reference points.

Needless to say, the configuration of FIG. 1 corresponds only to parts related to the embodiments of the present invention and the vehicular system for outputting a warning 100 included in an actual vehicle may include a greater number of components than those shown in FIG. 1 in some embodiments, and the telematics module no may be installed in the AVN system 120 as one embodiment of the AVN system 120.

The point-deduction behavior detection unit 140 may be included an advanced driver assistance system (ADAS), may use at least some embodiments of the ADAS, or may have a configuration similar to the ADAS in order to detect an abnormal driving behavior, such as centerline violation, or lane departure, as the reason for deducting points. For example, the point-deduction behavior detection unit 140 may be embodied as a lane departure warning (LDW) system or a lane-keeping assist system (LKAS), but is not limited thereto.

Based on the aforementioned configuration of the system, a warning output procedure according to embodiments of the present invention will be described.

According to an embodiment of the present invention, a warning may be output along with deduction of a preset number of the reference point due to abnormal driving behavior, which will be described with reference to FIG. 2.

Figure 2:
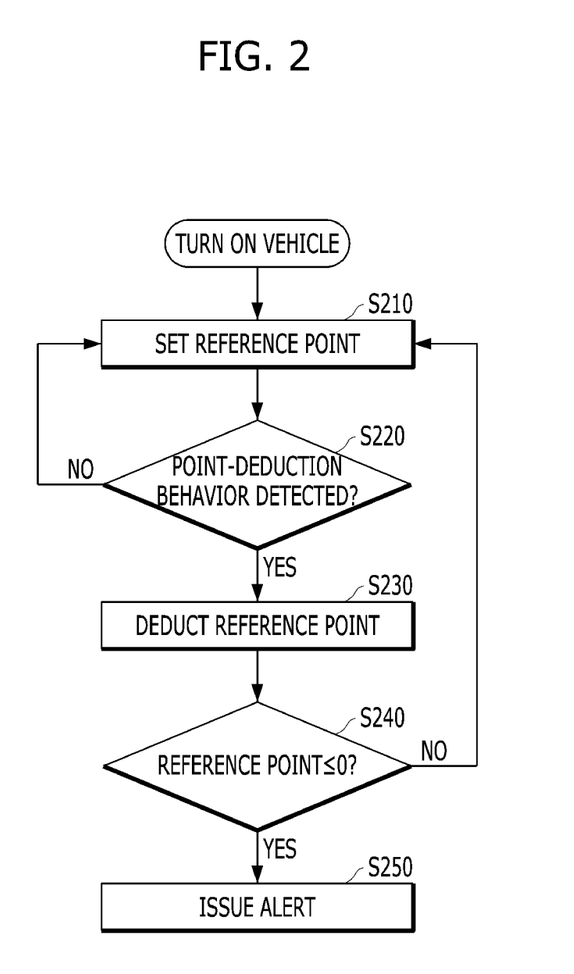
FIG. 2 is a flowchart showing an example of a warning output procedure according to an embodiment of the present invention.

FIG. 2 is a flowchart showing an example of a warning output procedure according to an embodiment of the present invention.

Referring to FIG. 2, when a vehicle begins to be driven as being turned on, the reference point management unit 130 may set a reference point (S210). Here, the reference point may comply with a preset value.

During driving, when the point-deduction behavior detection unit 140 detects a point-deduction behavior (S220), a point corresponding to the detected point-deduction behavior may be deducted from the reference point (S230). In this case, the deducted points may be smaller than the reference point.

When point deduction is accumulated and the reference point reaches or falls below 0 (S240), an alert may be issued (S250). For example, when a preset reference point is 5 and a deducted point for each point-deduction behavior is 1, the alert may be issued upon accumulation of five instances of point-deduction behaviors.

Examples of issuance of the alert may include output of a warning sound/message, lighting of a cluster warning light, and connection with a telematics center through the telematics module no. When a connection with a telematics center is established, a call with an attendant may be performed, and therethrough, a vehicle may be guided to an adjacent resting place according to guidance of the attendant. Needless to say, the issuance of the alert is exemplary, and it will be obvious to one of ordinary skill in the art that warning may be issued in different forms.

However, as described above, when the reference point is fixed to a preset value, warning may not be output at an appropriate time point depending on the time period, road characteristics, or the like. For example, in a time period after meals when drowsiness occurs, at midnight, or the like, there may be the possibility of an accident occurring before deducted points exceed the specific reference value.

Accordingly, according to the proposal of another embodiment of the present invention, in order to more rapidly output warning in a time period or an area in which close attention is required, a reference point and a point deduction degree may be variably set in consideration of the driving environment, which will be described with reference to FIG. 3.

Figure 3:
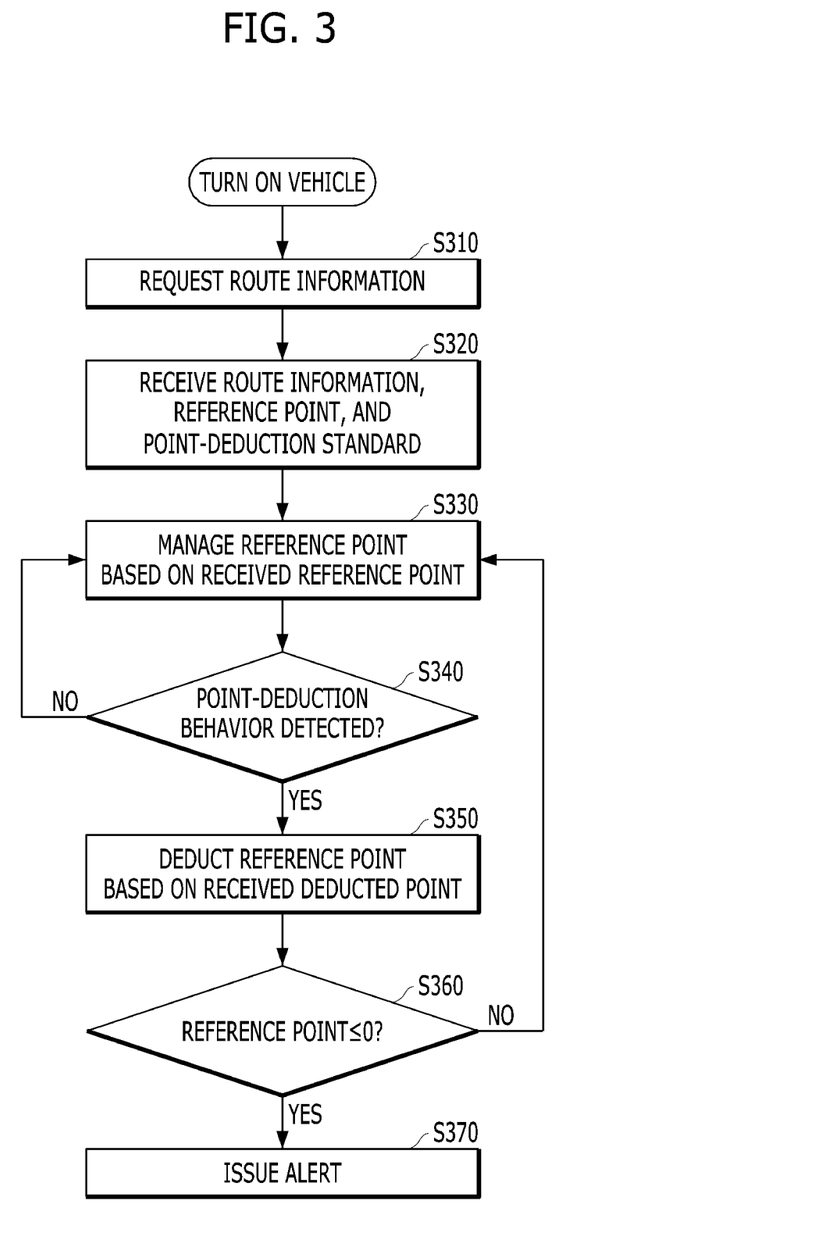
FIG. 3 is a flowchart showing an example of a warning output procedure according to another embodiment of the present invention.

FIG. 3 is a flowchart showing an example of a warning output procedure according to another embodiment of the present invention.

Referring to FIG. 3, when a driver inputs a destination through the AVN system 120, the telematics module 110 may make a request for route information to the telematics center (S310).

Accordingly, the telematics center may search for the route information and may transmit information on an optimum recommended route to a vehicle (S320). In this case, the vehicle may receive both the reference point and point-deduction standard information for the route along with the route information. Here, the telematics center may identify and manage a road using an identifier ID, and thus the reference point and point-deduction standard information for the route may be provided for each of at least one road ID up to the destination. The reference point and the point-deduction standard information as well as the road ID may be values obtained in further consideration of a time period.

When request and reception of the route information are performed at predetermined update periods (e.g., five minutes), the reference point and the point-deduction standard information may be updated in real time. In addition, in the case in which the route information is requested, the reference point set in the corresponding vehicle and the current point of the vehicle may be transmitted together with the current position to the telematics center.

Upon receiving the reference point and the point-deduction standard information, the reference point management unit 130 may manage the reference point based on the received reference point (S330). In this case, when a road ID is changed, the reference point may be changed to a reference point corresponding to the current road ID.

Then, during driving, when the point-deduction behavior detection unit 140 detects a point-deduction behavior (S340), the reference point management unit 130 may deduct a point corresponding to the detected point-deduction behavior from the current reference point based on the received point-deduction standard (S350). In this case, the point-deduction standard may be changed to a point-deduction standard corresponding to the current road ID.

When point deduction is accumulated and the reference point reaches or falls below 0 (S360), an alert may be issued (S370). Issuance of the alert is the same as in the above description, and thus a repeated description is omitted for clarity of the specification.

According to the aforementioned embodiment, in the vehicular system for outputting a warning 100, the reference point and the point-deduction standard information need to be provided from the telematics center. Accordingly, hereinafter, the configuration and operation of the telematics center according to the present embodiment will be described with reference to FIGS. 4 to 6.

Figure 4:
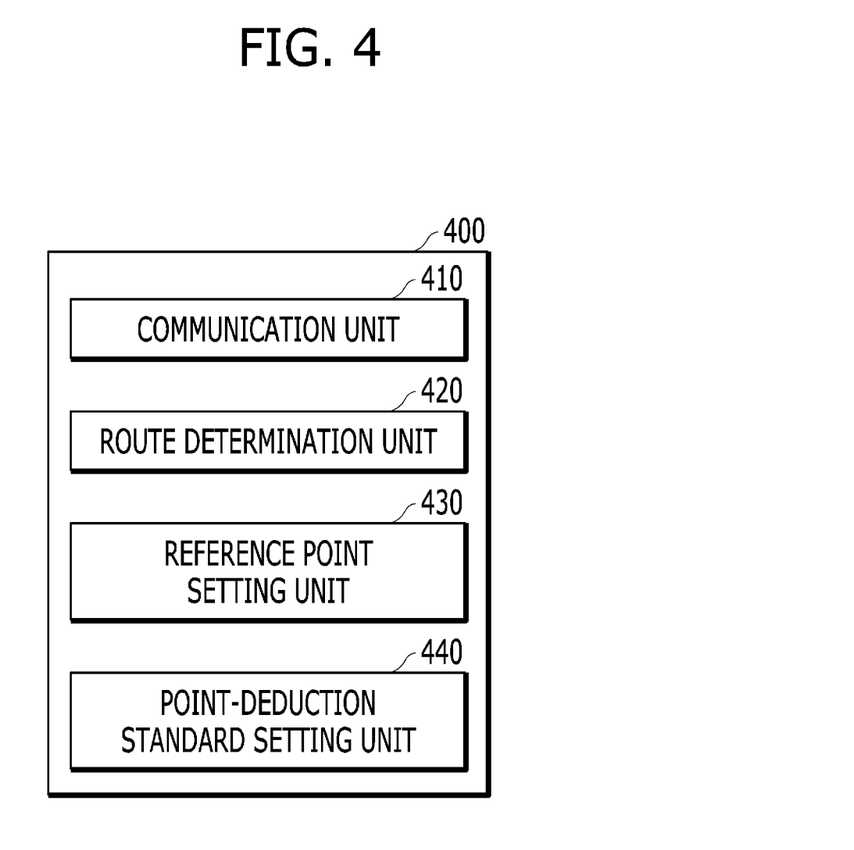
FIG. 4 is a block diagram showing an example of the configuration of a telematics center according to another embodiment of the present invention.
Figure 5:
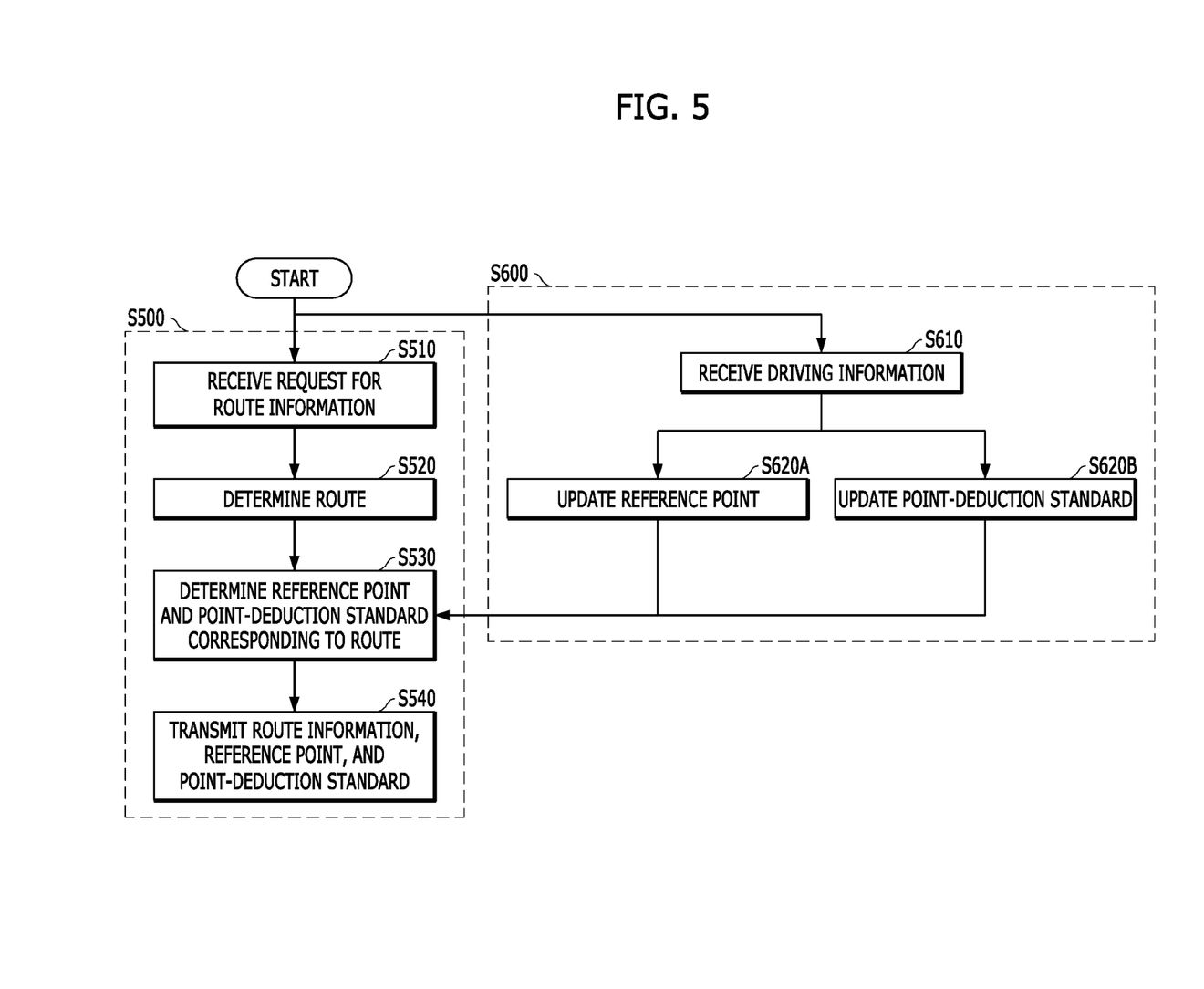
FIG. 5 is a flowchart showing an example of an operating procedure of a telematics center according to another embodiment of the present invention.

FIG. 4 is a block diagram showing an example of the configuration of a telematics center according to another embodiment of the present invention. FIG. 5 is a flowchart showing an example of an operating procedure of a telematics center according to another embodiment of the present invention.

First, referring to FIG. 4, a telematics center 400 according to the present embodiment may include a communication unit 410 configured to exchange data with at least one vehicle including the telematics module no and to perform call connection, a route determination unit 420 configured to search for an optimum route in the case of request of the vehicle route, a reference point setting unit 430 configured to set a reference point for each road contained in the route determined by the route determination unit 420, and a point-deduction standard setting unit 440.

Needless to say, the configuration of FIG. 4 corresponds only to parts related to the embodiments of the present invention, and an actual telematics center may include a greater number of components than in FIG. 4 in some embodiments.

As shown in FIG. 5, an operation of the telematics center 400 may be broadly classified into 1) transmitting the route related reference point and point-deduction standard together with route information to the vehicle in response to vehicle request (S500 and 2) managing the reference point and point-deduction standard for each road (S600).

With reference to FIG. 5, the transmitting the route related reference point and point-deduction standard together with route information to the vehicle in response to vehicle request will be described below.

First, upon receiving the request for the route information from the vehicle through the communication unit 410 (S5140), the route determination unit 420 may determine an optimum route to a destination (S520). In this case, the request for the route information may further include a position of the vehicle that transmits the request, the set reference point, current reference point information, and the like together with requested destination information. A route determination procedure may apply various well known navigation algorithms, and thus a description thereof will be omitted.

When the route is determined, the reference point setting unit 430 may determine reference point information for each ID of a road included in the route and the point-deduction standard setting unit 440 may determine the point-deduction standard information for each ID of a road included in the route (S530). In this case, the reference point setting unit 430 and the point-deduction standard setting unit 440 may further consider the current time period together with a road ID.

Accordingly, the route information, the reference point, and the point-deduction standard information may be transmitted to the vehicle through the communication unit 410 (S540).

Hereinafter, the managing the reference point and point-deduction standard for each road (S600) will be described.

As described above, when a vehicle is connected to the telematics center through route request information or output of a warning based on deduction of a reference point, the telematics center may receive driving information of the corresponding vehicle (S610). The driving information may include information on a vehicle position, a set reference point, the current reference point, a number of instances of point-deduction behaviors, and the like.

Based on the received driving information, the reference point setting unit 430 may update the reference point for each road and each time period (S620A) and the point-deduction standard setting unit 440 may update the point-deduction standard information for each road and each time period (S620B).

Hereinafter, an update procedure of the reference point setting unit 430 and the point-deduction standard setting unit 440 will be described in more detail.

First, the update operation S620A of the reference point setting unit 430 will be described.

Figure 6:
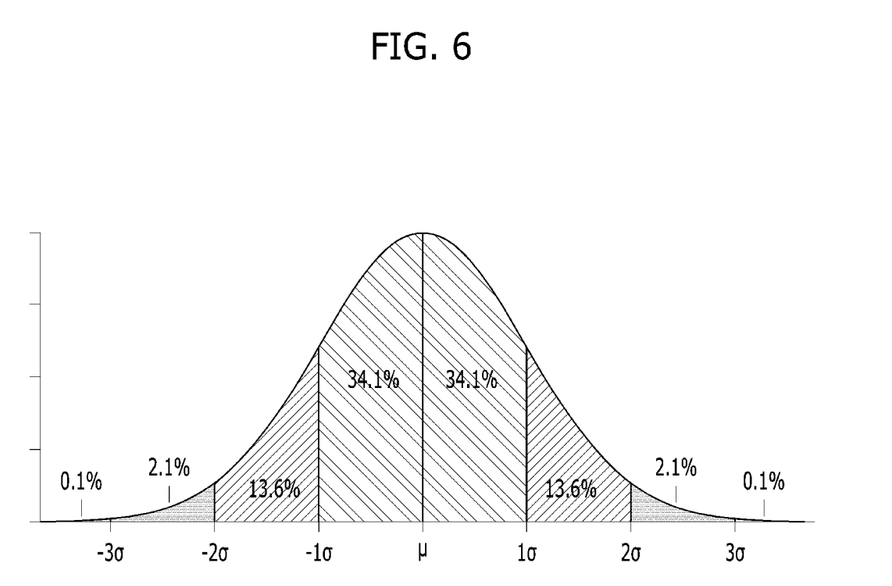
FIG. 6 shows a Gaussian distribution applied to another embodiment of the present invention.

The aforementioned driving information may be received from a plurality of vehicles, and driving information items received from the respective vehicles are independent from each other statistically, and thus when the driving information items of all the vehicles is analyzed, the driving information items generally follow a Gaussian distribution. Such a Gaussian distribution is shown in FIG. 6. FIG. 6 shows a Gaussian distribution applied to another embodiment of the present invention.

Referring to FIG. 6, the reference point setting unit 430 may establish a reference point based on drivers within ±w (G being standard deviation) corresponding to about 68.2% of peoples based on a Gaussian distribution for each time period. Here, a value of 16 is selected because the value is used to identify a plurality of users statistically, but this is exemplary and it will be obvious to one of ordinary skill in the art that a standard deviation value, serving as a reference, may be set differently.

Accordingly, the reference point setting unit 430 may update the reference point based on drivers corresponding to a range of ±16 in a corresponding time period, and thus in the aforementioned operation S530, a reference point corresponding to the request time of operation S510 may be transmitted to the vehicle. Here, the reference point may be expressed in units of 0.1 points and the reference for differentiating time periods may be a unit of 1 hour, but the present invention is not limited thereto.

Hereinafter, the update operation S620B of the point-deduction standard setting unit 440 will be described.

The point-deduction standard may be set in a unit of one decimal place (i.e., 0.X) by default, but the point-deduction standard setting unit 440 may variably reinforce the point-deduction standard (e.g., −0.5 to −1.5) depending on the time period and an area.

For example, a reinforcement reference condition may be set as follows.

1) Reinforced area reference: High-accident frequency area, and area with high vehicle traffic
2) Time period after lunch: 12:00 to 14:00
3) Midnight: 01:00 to 03:00
4) Others: Area in which lane departure occurs predetermined number of times or greater as the result of analysis of vehicle driving information When a condition in which a plurality of conditions among the aforementioned reinforcement reference conditions overlap each other is satisfied (when a vehicle is present in a high-accident frequency area at 1 p.m. and is present on a road characterized in that a warning of a driver warning system is frequently output), point-deduction standard information for the corresponding vehicle may be determined as the largest value of point-deduction standard values set in a separate reinforcement reference condition. This is because a warning is output in the case of lane departure only once to cause inconvenience of a driver when respective point-deduction standards for a plurality of reinforcement reference conditions are summed. Needless to say, on the other hand, point-deduction standard values set in the respective reinforcement reference conditions may be summed, in which case a maximum value of the point-deduction standard values applied when the conditions overlap with each other may also be set.

According to at least one embodiment of the present invention configured as described above, an abnormal driving situation may be more effectively determined.

In particular, according to the present invention, when whether to output an alert is determined, the reference point and the point-deduction standard may be set in consideration of a route, a time period, and the like, and thus a warning may be effectively output.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of outputting a warning of a vehicle, the method comprising:
    making a request for a route to a telematics center;
    receiving route information, a reference point, and point-deduction standard information from the telematics center in response to the request, wherein the reference point and the point-deduction standard information are determined in consideration of each of a time period of the request and at least one road included in the route information;
    setting the received reference point and deducting a point corresponding to the point-deduction standard information from the reference point whenever a point-deduction behavior is detected; and
    issuing the warning when a current point is equal to or less than a preset reference point, wherein the point-deduction standard information is determined as a value corresponding to a reinforcement reference with a high point deduction degree when a plurality of reinforcement references are satisfied among at least one preset reinforcement reference for each time period and each road.

2. The method of claim 1, wherein issuing the warning comprises outputting the warning in the vehicle or connecting with an attendant to issue the warning.

3. The method of claim 1, wherein making the request comprises transmitting at least one of a current position, a number of instances of point-deduction behaviors, the set reference point, and the current point to the telematics center.

4. The method of claim 1, wherein the point-deduction behavior comprises a lane departure or a centerline violation.

5. The method of claim 1, wherein the deducting comprises applying the reference point and point-deduction standard information corresponding to a road on which the vehicle is currently being driven.

6. A vehicular system for a vehicle, the vehicular system comprising:
    computer readable code stored in a computer readable recording medium and configured to be executed in a computer, the computer readable code when executed being configured to
    make a request for a route to a telematics center and to receive route information, a reference point, and point-deduction standard information from the telematics center in response to the request, wherein the reference point and the point-deduction standard information are determined in consideration of each of a time period of the request and at least one road included in the route information;
    detect whether a point-deduction behavior occurs; and
    set the received reference point, to deduct a point corresponding to the point-deduction standard information from the reference point whenever the point-deduction behavior is detected, and to determine whether to issue a warning based on a current point and a preset reference value, wherein the point-deduction standard information is determined as a value corresponding to a reinforcement reference with a high point deduction degree when a plurality of reinforcement references are satisfied among at least one preset reinforcement reference for each time period and each road.

7. The vehicular system of claim 6, wherein the computer upon execution of the computer readable code is configured to issue the warning by outputting the warning in the vehicle or connecting with an attendant to issue the warning.

8. The vehicular system of claim 6, wherein, the computer upon execution of the computer readable code is configured to transmit at least one of a current position, a number of instances of point-deduction behaviors, the set reference point, and the current point to the telematics center when making the request for the route or issuing the warning.

9. The vehicular system of claim 6, wherein the point-deduction behavior comprises a lane departure or a centerline violation.

10. The vehicular system of claim 6, wherein the computer upon execution of the computer readable code is configured to apply the reference point and point-deduction standard information corresponding to a road on which the vehicle is currently being driven.

11. A method of controlling a telematics center, the method comprising:
    receiving a request for a route from a vehicle;
    generating route information in response to the request;
    determining a reference point and point-deduction standard information corresponding to each road included in the route information, wherein the determining is performed in consideration of a time at which the request for the route is received; and
    transmitting the route information, the reference point, and the point-deduction standard information to the vehicle, wherein determining the reference point and the point-deduction standard information comprises determining the point-deduction standard information as a value corresponding to a reinforcement reference with a high point deduction degree when a plurality of reinforcement references are satisfied among at least one preset reinforcement reference for each time period and each road.

12. The method of claim 11, further comprising receiving driving information including at least one of a current position, a number of instances of point-deduction behaviors, a reference point set by the vehicle, and a current point from each of a plurality of vehicles.

13. The method of claim 12, further comprising updating the reference point based on the driving information and a time at which the driving information is received and updating the point-deduction standard information.

14. The method of claim 13, wherein the updating comprises updating the reference point to a reference point corresponding to a specific standard deviation range of a Gaussian distribution for each time period from the driving information.

15. The method of claim 12, wherein receiving the driving information is performed with the receiving the request for the route or is performed when a warning is output from the vehicle along with deduction of the reference point.

16. The method of claim 11, wherein each road included in the route information is managed by a road identifier.

17. The method of claim 11, wherein receiving the request for the route is performed at predetermined periods.

* * * * *